United States Patent
Emma et al.

(10) Patent No.: US 7,472,226 B1
(45) Date of Patent: Dec. 30, 2008

(54) METHODS INVOLVING MEMORY CACHES

(75) Inventors: Philip G. Emma, Danbury, CT (US); Robert K. Montoye, Jersey City, NJ (US); Vijayalakshmi Srinivasan, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/052,163

(22) Filed: Mar. 20, 2008

(51) Int. Cl.
*G06F 12/00* (2006.01)

(52) U.S. Cl. .................................. 711/128; 711/118
(58) Field of Classification Search ............... 711/128
See application file for complete search history.

(56) References Cited

U.S. PATENT DOCUMENTS 6,212,602 B1 * 4/2001 Wicki et al. ............ 711/122
6,862,660 B1   3/2005 Wilkins et al.
2003/0014597 A1 * 1/2003 van de Waerdt ......... 711/136

\* cited by examiner

*Primary Examiner*—Kevin L Ellis
*Assistant Examiner*—Matthew Bradley
(74) *Attorney, Agent, or Firm*—Cantor Colburn LLP; Lisa Yamonaco

(57) ABSTRACT

A method for accessing data in memory comprising, receiving address bits associated with a data item including a first tag, an index, and a sector ID from a requestor, associating the index with a congruence class in a primary directory, determining whether the first tag matches a second tag in a plurality of tags in the congruence class, wherein the each tag of the plurality of tags uniquely identifies a cache line associated with a primary ID in the congruence class, defining the primary ID of the second tag of the primary directory that matches the first tag, determining whether the primary ID and the sector ID are present in a secondary directory entry having a one to one correspondence with a sector in a data array, and sending the data item from the sector to the requestor.

3 Claims, 3 Drawing Sheets

METHODS INVOLVING MEMORY CACHES

CROSS-REFERENCE

The present application is co-pending with the concurrently filed application, having Ser. No. 12/052,160 filed 20 Mar. 2008 entitled "SYSTEMS INVOLVING MEMORY CACHES," assigned to the assignee of the present application, the contents of which are incorporated herein by reference in their entirety.

BACKGROUND OF THE INVENTION

1. Field of the Invention

The invention relates generally to a method for storing and retrieving data in a memory cache system.

2. Description of Background

Data processing systems typically include a central processing unit (CPU) that executes instructions of a program stored in a main memory. To improve the memory response time, cache memories are used as high-speed buffers emulating the main memory. In general, a cache includes a directory to track stored memory addresses and a data array for storing data items present in the memory addresses. If a data item requested by the CPU is present in the cache, the requested data item is called a cache hit. If a data item requested by the CPU is not present in the cache the requested data item is called a cache miss.

The cache is usually smaller than the main memory, thereby limiting the amount of data that may be stored in the cache. To exploit temporal and spatial locality of data references, caches often store a most recently referenced data item, and store contiguous (in address) blocks of data items, respectively. The contiguous block of data items is referred as a cache line, and is the unit of transfer from the main memory to the cache. The choice of the number of bytes in a cache line is one parameter in a cache design. In a fixed size cache, a small line size, exploits temporal locality, and allows more unique lines to be stored, but increases the size of the directory. A large line size exploits spatial locality, but increases the amount of time needed to transfer the line from main memory to cache (a cache miss penalty), and limits the number of unique lines that can be resident in the cache at the same time.

Cache sectoring reduces the cache miss penalty. In cache sectoring, cache lines are divided into "sectors," where the sector size is a function of a memory bus width. When a cache miss occurs, a cache line address is installed in a directory, but only the sector containing a referenced data item is transferred to a data array.

In sectored-caches, each directory entry maintains a "presence" bit per sector in the line. Presence bits are used to indicate which of the sectors in a line are present in the cache. Sectoring enables maintaining a small directory with a large line size without increasing the cache miss penalty. However, sectoring uses the data array inefficiently. For example, if a cache line is 32 bytes, and is made up of 4 byte sectors, there are 8 sectors in the cache line. If on average, only 3 out of the 8 sectors are referenced, 63% of the data array is "dead space." which does not contain any useful data.

SUMMARY OF THE INVENTION

The shortcomings of the prior art are overcome and additional advantages are achieved through an exemplary method for accessing data in memory, the method comprising, receiving address bits associated with a data item including a first tag, an index, and a sector ID from a requestor, associating the index with a congruence class in a primary directory, determining whether the first tag matches a second tag in a plurality of tags in the congruence class, wherein the each tag of the plurality of tags uniquely identifies a cache line associated with a primary ID in the congruence class, defining the primary ID of the second tag of the primary directory that matches the first tag responsive to determining that the first tag matches the second tag in a plurality of tags in the congruence class, determining whether the primary ID and the sector ID are present in a secondary directory entry having a one to one correspondence with a sector in a data array, and sending the data item from the sector to the requestor responsive to determining that the primary ID and the sector ID are present in the secondary directory entry.

Additional features and advantages are realized through the techniques of the present invention. Other embodiments and aspects of the invention are described in detail herein and are considered a part of the claimed invention. For a better understanding of the invention with advantages and features, refer to the description and to the drawings.

BRIEF DESCRIPTION OF THE DRAWINGS

The subject matter that is regarded as the invention is particularly pointed out and distinctly claimed in the claims at the conclusion of the specification. The foregoing and other aspects, features, and advantages of the invention are apparent from the following detailed description taken in conjunction with the accompanying drawings in which:

The detailed description explains the preferred embodiments of the invention, together with advantages and features, by way of example with reference to the drawings.

DETAILED DESCRIPTION OF THE INVENTION

Systems involving storing and accessing data in a cache are provided.

Figure 1:
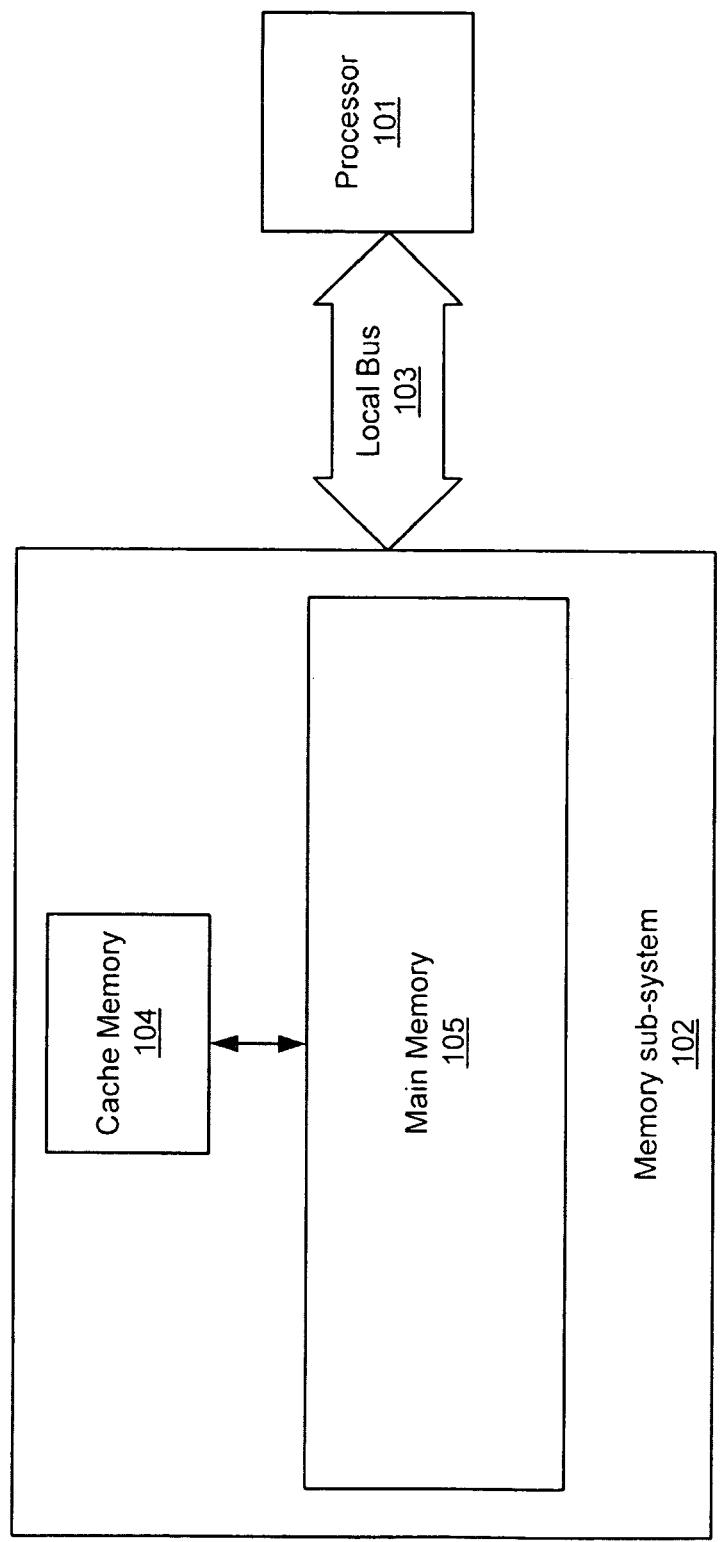
FIG. 1 illustrates an exemplary embodiment of a computer system.

In this regard, FIG. 1 illustrates a schematic representation of an exemplary embodiment of a computer system, including a processor 101 communicatively linked to a memory subsystem 102 via a local bus 103. The memory subsystem 102 includes a cache memory 104 and main memory 105. The cache memory 104 includes one or more levels of memory.

In operation the processor 101 requests data from the memory subsystem 102 via the local bus 103. The cache memory 104 is searched for a requested data item. If the requested data item is present in the cache memory 104, the data item is sent to the processor 101 on the local bus 103. If the data item is not present in the cache memory 104, the request is forwarded to the main memory 105, and the data is supplied to the processor 101. A copy of the data item is also stored in the cache memory 104.

Figure 2:
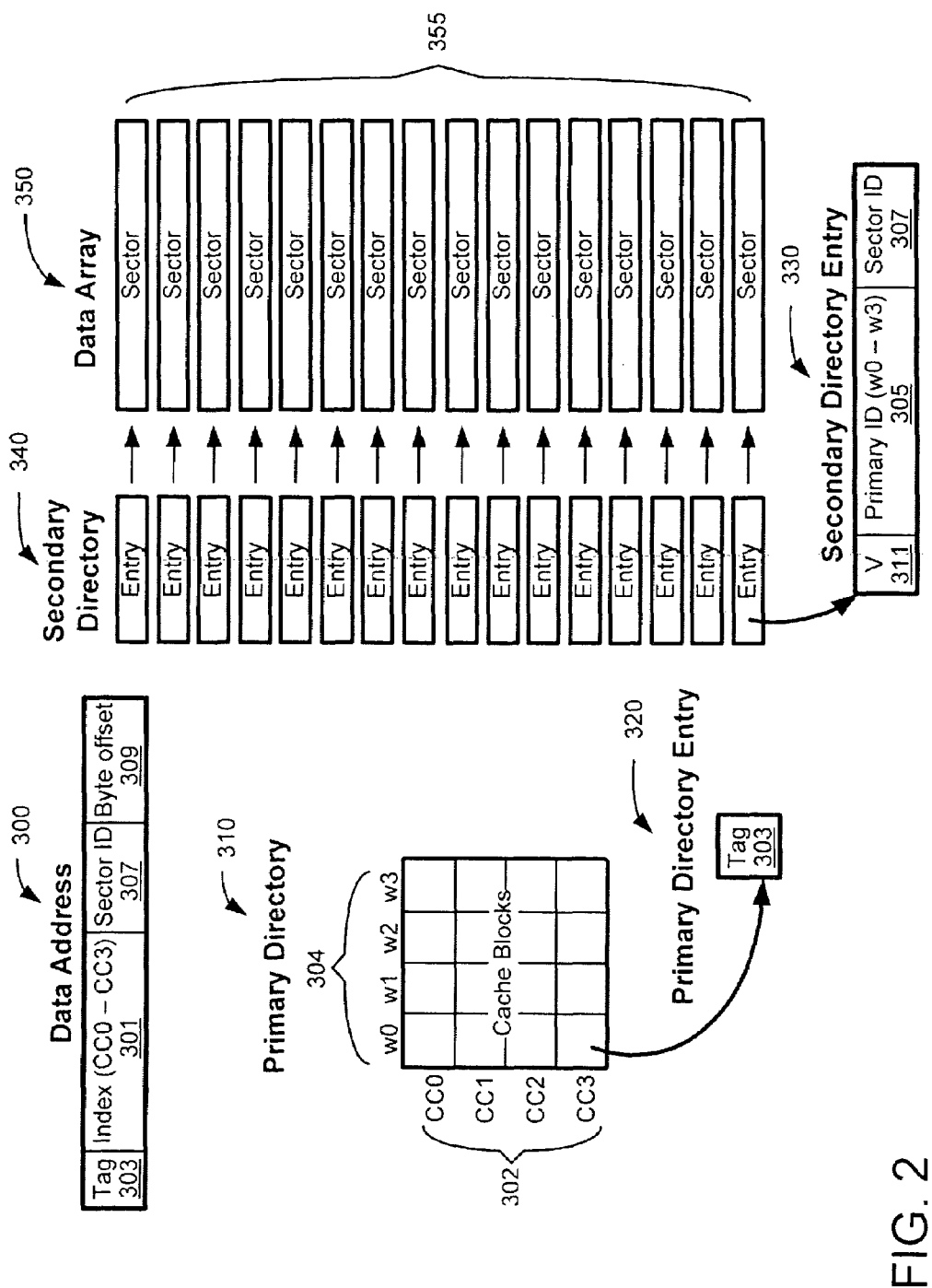
FIG. 2 illustrates an exemplary embodiment of a cache directory.

FIG. 2 illustrates an exemplary embodiment of a memory cache structure wherein a data array 350 is organized in sectors 355. The sectors 355 maintain a 1:1 correspondence with secondary directory entries 330 of a secondary directory 340. Each entry 330 in the secondary directory 340 has three fields: a valid bit field (V) 311, a primary ID 305, and a sector ID 307.

The memory cache structure also includes a primary directory 310. The primary directory 310 is organized in rows that make up congruence classes (CC0-CC3) 302 and columns that make up ways (w0-w3) 304. Each cache block of the primary directory 310 holds a tag 303 as a primary directory entry 320. The number of directory entries in the primary directory 310 is equal to the number of lines having sectors 355 that may be stored at any time. The embodiment of FIG. 2 is a 4-way associative cache. Larger or smaller caches may be implemented in a similar structure.

FIG. 2 shows the data address 300 having fields used to map the address to the cache entry. Least significant bits of the data address 300 is a "byte offset" 309. The higher order bits following the byte offset 309 are a "sector ID" 307. The more significant bits shown represent an "index" 301. The "tag" 303 is the most significant bits stored in the data address 300.

In operation, assuming that the requested data is present in the cache, a desired data entry (not shown) stored in a sector 355 of the data array 350 will have a data address 300. Each primary directory entry 320 in the congruence class 302 holds a tag 303. The index 301 and the tag 303 in the data address 300 are used to determine the way 304 (column) that holds the tag 303 in the primary directory 310. The index 301 identifies the congruence class 302 (row) that holds the tag 303. Once the congruence class 302 is located, each of the primary directory entries 320 in the located congruence class 302 are compared to the tag 303 in the data address 300 to find the matching tag 303. When the matching tag 303 is found, the way 304 (column) that holds the matched tag 303 in the primary directory 310 is determined.

Once the way 304 is determined, the secondary directory 340 may be accessed. The way 304 corresponds to way values stored as the primary ID 305 in the secondary directory entries 330. The sector ID 307 in the data address 300 corresponds to the sector ID 307 in the secondary directory entry 330. The appropriate secondary directory entry 330 is found by searching the secondary directory 340 to match the determined way 304 and the sector ID 307 (from the data address 300) to the primary ID 305 and the sector ID 307 respectively of the secondary directory entries 330 stored in the secondary directory 340. Once the appropriate secondary directory entry 330 is found, the 1:1 correspondence of the secondary directory entry 330 to the sectors 355 in the data array 350 map the location of the sector 355 holding the requested data.

Valid bit field (V) 311 in the secondary directory entry 330 that indicates whether a data entry is valid may be included in the secondary directory entry. Additionally, the data address 300 may include the "byte offset" 309 that is used to determine the datum accessed within a cache sector.

If the average number of sectors 355 used within a line is x, and the number of address tags 303 held in the primary directory 310 is y, then the data array 350 is implemented to accommodate at least x times y sectors. The primary directory 310 has y entries and the secondary directory 340 has x times y entries. The value of x is workload (application) dependent, and is independent of y.

Figure 3:
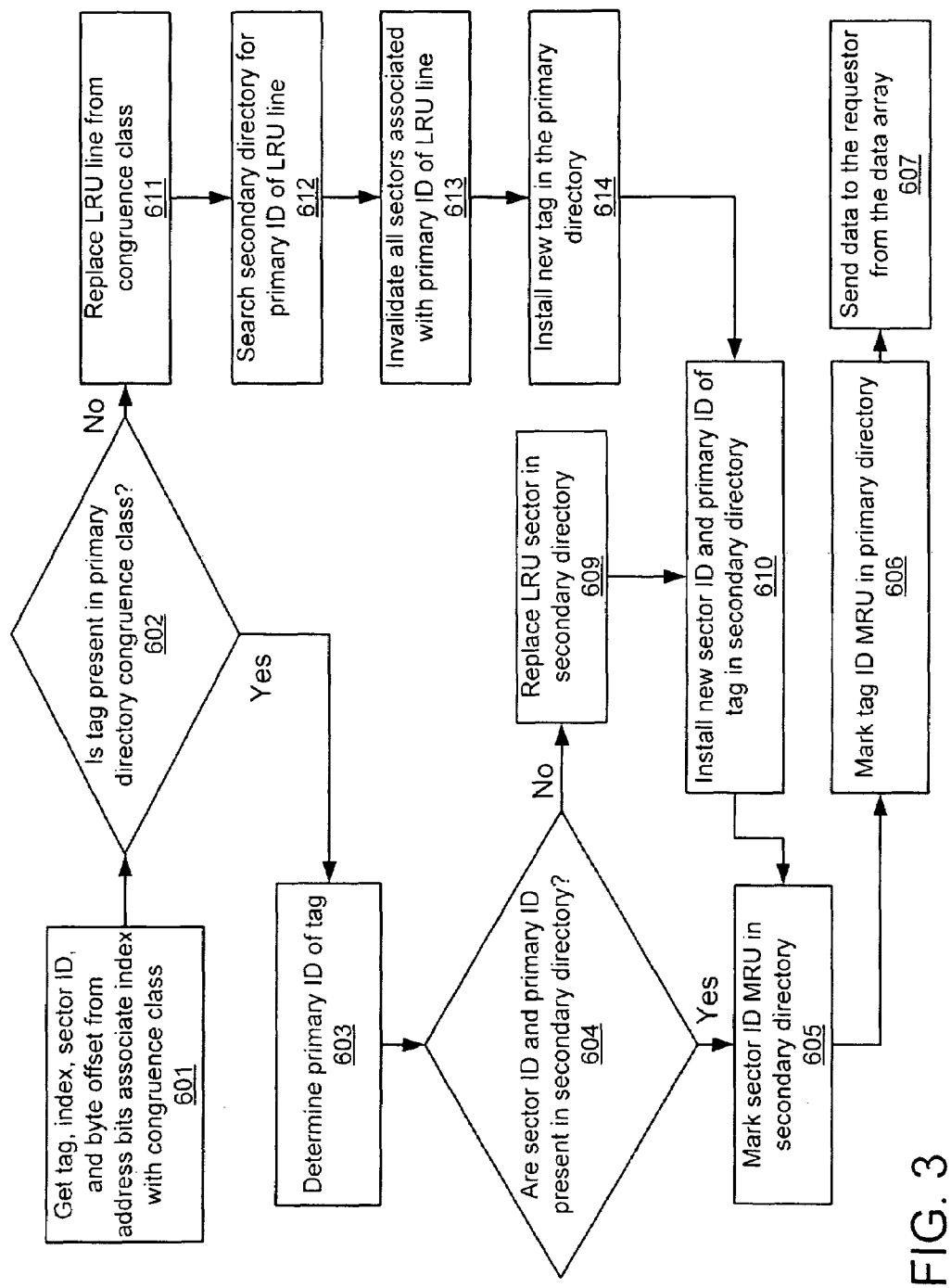
FIG. 3 illustrates a block diagram of an exemplary method for accessing data in a data cache.

FIG. 3 illustrates a flow diagram of an exemplary method for accessing data from a cache. Beginning in block 601, the tag 303, index 301, and sector ID 307 (illustrated in FIG. 2) are determined from the address bits by the processor 101 (illustrated in FIG. 1). The index 301 identifies the congruence class in the primary directory 310 (illustrated in FIG. 2) that address is mapped to. Each entry in the congruence class 302 has a tag 303 that uniquely identifies the cache line present in the position. In block 602, the tag 303 is compared associatively with all the other tags 303 present in the congruence class 302 of the primary directory 310 to determine if there is a match, i.e. if the tag 303 is present in the congruence class 302 in the primary directory 310. If there is a match, the next step shown in block 603 is to determine the primary ID 305 of the tag match of the primary directory 310. For example, in a 4-way set-associative cache, there are 4 tags present in the primary directory 310 congruence class 302, with primary IDs 0, 1, 2, and 3, respectively. The primary ID 305 can therefore be represented using, 2 bits. In the next step, block 604, the primary ID 305 from block 603, and the sector ID 307 are used to associatively search the secondary directory 340 for the presence of the relevant sector in the cache. If there is a match in the secondary directory 340, the access is a cache hit, and the next step is shown in block 605.

For exemplary purposes, the steps in processing a cache hit/miss are described assuming that the primary directory 310 and the secondary directory 340 are maintained using the least-recently-used (LRU) replacement policy. Other policies may be used. In block 605, the matching entry in the secondary directory 340 is marked as the most-recently-used (MRU) entry. In the next step, block 606, the matching entry in the congruence class of the primary directory 310 is also marked as the most-recently-used (MRU) entry. The 1:1 mapping between the secondary directory 340 and the data arrays 350 is used to access the corresponding data (sector 355) from the data array 350 to be sent to the processor 101 (requestor), and is shown in block 607.

If there is no match in the secondary directory for the sector ID 307, in block 604, the access is a cache miss, and the next step is shown in block 609. The least-recently-used (LRU) sector 355 from the secondary directory 340 is replaced in block 609 to accommodate the new incoming sector ID 307. In the next step, block 610, the new sector ID 307 and the corresponding primary ID 305 are installed in the secondary directory 340. This is followed by the step in block 605 where the installed entry in the secondary directory 340 is marked as the most-recently-used (MRU) entry. In the next step, block 606, the matching entry in the primary directory 310 of the congruence class 302 is marked as the most-recently-used (MRU) entry. The next step shown in block 607, sends data to the processor 101 (requestor) from the data array 350.

If there is no match for the tag 303 in the primary directory 310 in block 602, the least-recently-used (LRU) line from the primary directory 310 is replaced in block 611 to accommodate the new incoming tag 303. In the next step shown in block 612, the secondary directory 340 is searched associatively for the primary ID 305 of the replaced LRU line. All the sectors 355 belonging to the primary ID 305 of the LRU line (replaced from the primary directory 310 in block 611), are invalidated (the valid bit 311 is reset to 0) in the secondary directory 340 in the next step shown in block 613. In the following step, shown in block 614, the new tag 303 is installed in the primary directory 310. This is followed by step 610, where the corresponding sector ID 307 and the primary ID of tag 303 are installed in the secondary directory 340. In block 605, the sector ID 307 is marked as the most recently used entry in the secondary directory 310. In block 606, following block 605, the tag 303 is marked as the most recently used entry in the primary directory 310. Finally, in block 607, the data is sent to the processor 101 (requestor) from the data array 350.

For exemplary purposes the management of the sectored primary directory 310 using the least-recently-used algorithm was used above. The LRU stack of the primary directory 310 may be managed to enable retaining lines showing spatial locality in their accesses. In this alternate management policy, new lines are inserted into the middle of the LRU stack of the primary directory 310 as opposed to being inserted as the most-recently-used entry in the traditional LRU management. On an MRU sector change within a line, the tag 303 is moved up one position in the stack, and swaps place with the tag that had been there. The policy allows a tag 303 to become MRU only if it has at least two different sectors 355 of the line that are accessed during its residency in the primary directory 340. This alternate policy only uses an additional field per entry to added to track the MRU sector for each line, and does not change the organization of the primary directory 310.

The secondary directory 340 may also be organized as a traditional set-associative directory, with congruence classes, and sets. The alternate set-associative secondary directory 340 may be indexed using the sector ID field 307 of the address bits. Within the congruence class (index), an associative search of the primary ID 305 can be used to determine a match.

Any sector 355 belonging to the LRU tag of the primary directory 310 may be chosen as a candidate for replacement to accommodate a new incoming sector 355 in the secondary directory 340. The alternate management policy of the secondary directory 340 eliminates the need to maintain a separate LRU stack order in the secondary directory, 340 as shown in FIG. 2.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A method for accessing data in memory, the method comprising:

receiving address bits associated with a data item including a first tag, an index, and a sector ID from a requestor;

associating the index with a congruence class in a primary directory;

determining whether the first tag matches a second tag in a plurality of tags in the congruence class, wherein the each tag of the plurality of tags uniquely identifies a cache line associated with a primary ID in the congruence class;

determining the primary ID of the second tag of the primary directory that matches the first tag responsive to determining that the first tag matches the second tag in a plurality of tags in the congruence class;

determining whether the primary ID and the sector ID are present in a secondary directory entry having a one to one correspondence with a sector in a data array; and sending the data item from the sector to the requestor responsive to determining that the primary ID and the sector ID are present in the secondary directory entry.

2. The method of claim 1, wherein the method further comprises marking the sector ID in the secondary directory as the most-recently-used (MRU) entry, responsive to determining that the primary ID and the sector ID are present in the secondary directory entry.

3. The method of claim 1, wherein the method further comprises marking the tag ID in the primary directory as the most-recently-used (MRU) entry, responsive to determining that the primary ID and the sector ID are present in the secondary directory entry.

* * * * *